(12) United States Patent
Durairaj et al.

(10) Patent No.: US 7,498,371 B2
(45) Date of Patent: Mar. 3, 2009

(54) MODIFIED PHENOLIC NOVOLAK RESINS AND APPLICATIONS THEREOF

(76) Inventors: Raj B. Durairaj, 123 Edgemeade Dr., Monroeville, PA (US) 15146; C. Michael Walkup, 107 Dinwiddie Dr., New Kensington, PA (US) 15068; Mark A. Lawrence, 5118 Scenic Rd., Murrysville, PA (US) 15668

( * ) Notice: Subject to any disclaimer, the term of this patent is extended or adjusted under 35 U.S.C. 154(b) by 428 days.

(21) Appl. No.: 11/234,423

(22) Filed: Sep. 23, 2005

(65) Prior Publication Data

US 2006/0069191 A1 Mar. 30, 2006

Related U.S. Application Data

(60) Provisional application No. 60/612,695, filed on Sep. 24, 2004.

(51) Int. Cl.
*C08K 3/04* (2006.01)
*C08K 5/09* (2006.01)

(52) U.S. Cl. .................................. 524/284; 524/495

(58) Field of Classification Search ................ 524/284, 524/495
See application file for complete search history.

(56) References Cited

U.S. PATENT DOCUMENTS

| 4,051,301 A | * | 9/1977 | Laitar ........................ 428/404 |
| 4,150,194 A | | 4/1979 | Watts et al. |
| 4,345,054 A | | 8/1982 | Takeda et al. |
| 4,404,334 A | | 9/1983 | Bornstein |
| 4,473,669 A | | 9/1984 | Rupert et al. |
| 4,723,592 A | | 2/1988 | Laitar et al. |
| 4,876,324 A | | 10/1989 | Nakano et al. |
| 5,264,535 A | | 11/1993 | Geoffrey et al. |
| 6,133,403 A | | 10/2000 | Gerber |
| 6,875,807 B2 | | 4/2005 | Durairaj et al. |

* cited by examiner

*Primary Examiner*—Robert D. Harlan

(57) ABSTRACT

A modified phenolic novolak resin is prepared by reacting a phenolic compound (e.g., resorcinol) with an aliphatic polyol. The reaction mixture further reacts with a formaldehyde to produce a modified phenolic novolak resin. The reaction is typically carried out in the presence of an acid or a base catalyst. The resulting resin is characterized by a relatively low level of free resorcinol; and rubber compounds containing the resin exhibit low fuming, lower Mooney viscosity (which means better processing), better dynamic stiffness properties (G'), and/or good tear properties. Therefore, the resulting resin can be used as a methylene acceptor compound in a vulcanizable rubber composition.

47 Claims, No Drawings

MODIFIED PHENOLIC NOVOLAK RESINS AND APPLICATIONS THEREOF

PRIOR RELATED APPLICATIONS

This application claims priority to U.S. Provisional Patent Application Ser. No. 60/612,695, filed Sep. 24, 2004, which is incorporated herein by reference in its entirety.

FEDERALLY SPONSORED RESEARCH STATEMENT

Not applicable.

REFERENCE TO MICROFICHE APPENDIX

Not applicable.

FIELD OF THE INVENTION

The invention relates to phenolic novolak resins, methods for their synthesis and applications thereof, especially in reinforced rubber compositions.

BACKGROUND OF THE INVENTION

Rubber articles, such as tires, belts and hoses, normally use reinforcing materials such as steel, polyester, nylon, aramid and rayon in the form of fibers, cords or fabrics. In the case of radial tire production, steel cords are often used as the reinforcing material. Steel cords for tires, in general, are coated with a layer of brass to promote the adhesion between the steel cords and the rubber compositions or compounds (designated hereafter as the steel cord adhesion). It is believed in some instances that the copper and zinc metal in the brass coating may react with sulfur, a vulcanizing agent in some rubber compositions, to form a bonding or sulfide layer, comprising sulphides of copper and zinc, between the steel cord and the rubber compositions. The formation of such a sulfide layer at the interface is responsible for the initial unaged steel cord adhesion.

To improve the steel cord adhesion, the current practices include adding in the rubber compositions a cobalt salt, such as cobalt naphthenate, and/or a phenolic adhesive composition comprising a methylene acceptor and methylene donor. The use of cobalt salt may regulate the formation and the composition of the bonding layer so as to affect the steel cord adhesion. The steel cord adhesion can also be improved by using novolak resins as a methylene acceptor and hexamethoxymethylmelamine (HMMM) or pentamethoxymethylmelamine (PMMM) as a methylene donor in the rubber compositions. On curing the rubber compositions, the reaction product of the methylene acceptor and the methylene donor forms a protective moisture resistant coating on the top of the bonding layer and protects the loss of the steel cord adhesion during aging.

Achieving higher levels of the steel cord adhesion and maintaining the steel cord adhesion under various environmental conditions, such as heat, humidity and saline conditions, are desirable for the long term durability of rubber tires. In an unaged condition, the steel cord adhesion generally exceeds the tear strength of the rubber composition and therefore, no bond failure occurs at the interface between the bonding layer and the rubber composition. However, in wet and salt water conditions, the steel cord adhesion may fail at the interface due to corrosion. Although the cobalt salt may be effective against the corrosive effects of salt water and moisture/steam, the use of novolak resins, along with HMMM, has also provided excellent steel cord adhesion under these corrosive conditions.

It is believed that the corrosion of steel cords is due to the attack of moisture under hot and wet conditions. If such an attack is prevented, then the corrosion of the steel wires can be avoided, thereby the steel cord adhesion level can be maintained under all aged conditions of the rubber tire. In this way the service life of the tire can be extended.

There are several existing approaches or methods employed to prevent or reduce the steel cords corrosion in rubber tires. These approaches or methods involve not only the rubber composition formulations but also the treatment of the steel cords. Although these approaches or methods may improve some desirable properties of rubber tires, the tire industry is constantly looking for alternative or better approaches to improve the properties of rubber tires including the corrosion resistance of steel cords and the steel cord adhesion between the steel cords and the rubber composition.

Therefore, there is a need for a new phenolic novolak resin that can be handled and used relatively safely in rubber composition formulations. Preferably, such resin can also improve the unaged, heat-aged and/or humidity-aged adhesion of the steel cords to cured rubber compositions.

SUMMARY OF THE INVENTION

Disclosed herein are modified phenolic novolak resins that have desirable properties suitable for making vulcanizable rubber compositions.

In one aspect, the modified phenolic novolak resins can be obtainable by reacting a phenolic compound with an aliphatic polyol and an aldehyde in the presence of an acid catalyst at a pH less than 7.

In another aspect, the modified phenolic novolak resin can be obtainable by reacting a unsubstituted or substituted resorcinol with an aliphatic polyol and an aldehyde in the presence of an acid catalyst.

In another aspect, the vulcanizable rubber compositions can comprise (a) a rubber component selected from natural rubber, synthetic rubber or combinations thereof, (b) a methylene donor compound which generates formaldehyde upon heating, and (c) a methylene acceptor compound comprising a modified phenolic novolak resin obtainable by reacting a phenolic compound with an aliphatic polyol and an aldehyde in the presence of an acid catalyst at a pH less than 7.

Disclosed herein are also processes of making the modified phenolic novolak resins that can improved the adhesion of the steel cords to rubber compositions.

In one aspect, the processes of making the modified phenolic novolak resins can comprise the step of reacting a phenolic compound with an aliphatic polyol and an aldehyde in the presence of an acid catalyst at a pH less than 7.

DESCRIPTION OF EMBODIMENTS OF THE INVENTION

In the following description, all numbers disclosed herein are approximate values, regardless whether the word "about" or "approximate" is used in connection therewith. They may vary by 1 percent, 2 percent, 5 percent or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent or 100 percent. Moreover, any numerical range defined by two R numbers as defined in the above is also specifically disclosed.

As used herein and unless otherwise indicated, the term "polyol" means an organic compound contains two or more hydroxyl groups. Some non-limiting examples of polyol groups include diols, triols, tetrols, pentols, hexols and the like.

As used herein and unless otherwise indicated, the term "aldehyde" means an organic compound having at least a —CHO group. Non-limiting examples of aldehyde have the formula R—CHO where R is H, alkyl, aralkyl, heteroalkyl, cycloalkyl, heterocycloalkyl, aryl or heteroaryl. Other non-limiting examples of aldehyde are dialdehydes having the formula OHC—R'—CHO where R' is a bond, alkylene or arylene.

As used herein and unless otherwise indicated, the term "substituted" as used to describe a compound or chemical moiety means that at least one hydrogen atom of that compound or chemical moiety is replaced with a second chemical moiety. The second chemical moiety can be any desired substituent that does not adversely affect the desired activity of the compound. Examples of substituents are those found in the exemplary compounds and embodiments disclosed herein, as well as halogen; alkyl; heteroalkyl; alkenyl; alkynyl; aryl, heteroaryl, hydroxyl; alkoxyl; amino; nitro; thiol; thioether; imine; cyano; amido; phosphonato; phosphine; carboxyl; thiocarbonyl; sulfonyl; sulfonamide; ketone; aldehyde; ester; oxo; haloalkyl (e.g., trifluoromethyl); carbocyclic cycloalkyl, which can be monocyclic or fused or non-fused polycyclic (e.g., cyclopropyl, cyclobutyl, cyclopentyl or cyclohexyl) or a heterocycloalkyl, which can be monocyclic or fused or non-fused polycyclic (e.g., pyrrolidinyl, piperidinyl, piperazinyl, morpholinyl or thiazinyl); carbocyclic or heterocyclic, monocyclic or fused or non-fused polycyclic aryl (e.g., phenyl, naphthyl, pyrrolyl, indolyl, furanyl, thiophenyl, imidazolyl, oxazolyl, isoxazolyl, thiazolyl, triazolyl, tetrazolyl, pyrazolyl, pyridinyl, quinolinyl, isoquinolinyl, acridinyl, pyrazinyl, pyridazinyl, pyrimidinyl, benzimidazolyl, benzothiophenyl or benzofuranyl); amino (primary, secondary or tertiary); o-lower alkyl; o-aryl, aryl; aryl-lower alkyl; —$CO_2CH_3$; —$CONH_2$; —$OCH_2CONH_2$; —$NH_2$; —$SO_2NH_2$; —$OCHF_2$; —$CF_3$; —$OCF_3$; —NH(alkyl); —N(alkyl)$_2$; —NH(aryl); —N(alkyl)(aryl); —N(aryl)$_2$; CHO; —CO(alkyl); —CO(aryl); —$CO_2$(alkyl); and —$CO_2$(aryl); and such moieties can also be optionally substituted by a fused-ring structure or bridge, for example —$OCH_2O$—. These substituents can optionally be further substituted with a substituent selected from such groups. All chemical groups disclosed herein can be substituted, unless it is specified otherwise.

Embodiments of this invention provide a modified phenolic novolak resin for use as a rubber compounding agent and a number of other applications. The modified phenolic novolak resin is obtainable by a process comprising reacting a phenolic compound with an aliphatic polyol and an aldehyde in the presence of an acid catalyst wherein the mole ratio of aldehyde to phenolic compound is between about 1:1 and about 0.1:1, between less than 0.9:1 and about 0.1:1, between 0.89:1 and about 0.1:1, between about 0.85:1 and about 0.1:1, between about 0.7:1 to about 0.1:1, between about 0.7:1 and about 0.2:1, or between about 0.5:1 and about 0.2:1. In some embodiments, the mole ratio of aldehyde to phenolic compound is less than 1:1, less than 0.9:1, less than 0.85:1, less than 0.8:1, less than 0.75:1, less than 0.7:1, less than 0.65:1, less than 0.6:1, less than 0.65:1, less than 0.6:1, less than 0.55:1, less than 0.5:1, less than 0.45:1, less than 0.4:1, less than 0.35:1, less than 0.3:1, less than 0.25:1, or less than 0.2:1.

Please note that the mole ratio of aldehyde to phenolic compound is defined with respect to the equivalent moles of formaldehyde and phenol, respectively. One skilled in the art can recognize that one mole of trioxane is equivalent to 3 moles of formaldehyde or one mole of dialdehyde is equivalent to 2 moles of formaldehyde. Therefore, if a trioxane is used, the mole ratio of aldehyde to phenolic disclosed herein should be reduced by a factor of 3. Similarly, if a dialdehyde is used, the mole ratio of aldehyde to phenolic compound disclosed herein should be reduced by a factor of 2. Conversely, if a bisphenol, such as bisphenol A, is used, the mole ratio of aldehyde to phenolic compound disclosed herein should be increased by a factor of 2 because one skilled in the art can recognize that one mole of bisphenol is equivalent to 2 moles of phenol.

In one embodiment, the phenolic compound reacts with the aliphatic polyol and the aldehyde simultaneously. In another embodiment, the phenolic compound reacts with the aliphatic polyol and the aldehyde sequentially. In a further embodiment, the phenolic compound reacts first with the aliphatic polyol and then with the aldehyde. In an additional embodiment, the phenolic compound reacts first with the aldehyde and then with the aliphatic polyol.

Phenolic resins can be categorized into two groups, i.e., resole and novolak resins. In general, the resole resins are prepared by reacting a phenolic compound with an excess of an aldehyde (i.e, the mole ratio of the phenolic compound to the aldehyde is less than 1), often in the presence of a basic catalyst. Generally, resole resins can be cured simply by heating without a curing agent because there is a sufficient amount of aldehyde to provide the necessary cross-linking density during curing. The resole resins are, therefore, one-stage polymers because they require only one step to complete the cross-linking.

Novolak resins on the other hand can be made by heating a phenolic compound with a deficiency of an aldehyde (i.e, the mole ratio of the phenolic compound to the aldehyde is greater than 1), often in the presence of an acid catalyst. Phenolic novolaks do not condense further by themselves unless a reactive material, such as additional aldehydes and formaldehyde donors (e.g., hexamethylenetetramine), is added. Therefore, novolak resins are two-stage polymers because they require an additional curing agent in a second step to complete the cross-linking.

Generally, the phenolic novolak resins are not cross-linked. Therefore, it is desirable that the mole ratio of aldehyde to phenolic compound is less than about 1 to prevent cross-linking and/or gelation during manufacture. In some embodiments, the mole ratio of aldehyde to phenolic compound is less than 1:1, less than 0.95:1, less than 0.9:1, less than 0.89:1, less than 0.85:1, less than 0.7:1, less than 0.6:1, less than 0.5:1, or less than 0.4:1. In other embodiments, the mole ratio of aldehyde to phenolic compound is between about 1:1 and about 0.1:1, between less than 0.9:1 and about 0.1:1, between 0.89:1 and about 0.1:1, between about 0.85:1 and about 0.1:1, between about 0.7:1 to about 0.1:1, between about 0.7:1 and about 0.2:1, or between about 0.5:1 and about 0.2:1. The phenolic novolak resins generally comprise no methylol functionality, have number average molecular weights ($M_n$) in the range of from about 125 to about 5000 daltons, and display glass transition temperatures in the range of from about 45° C. to about 100° C. In some embodiments, the $M_n$ is between about 125 and about 800 daltons or between about 800 and about 1500 daltons.

An example of a novolak reaction is illustrated in Scheme A below where the phenolic compound is resorcinol and the aldehyde is formaldehyde.

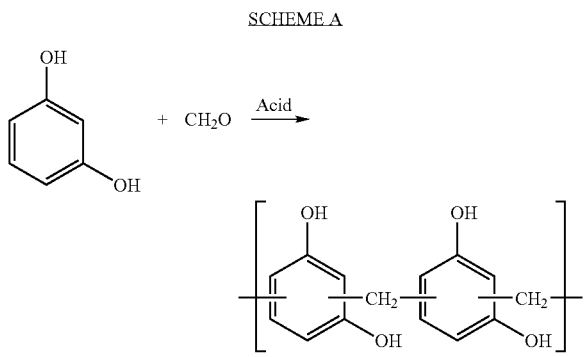

In some embodiments, the modified phenolic novolak resin can be made by reacting a phenolic compound with at least an aliphatic polyol in the presence of a catalyst to provide a phenol-polyol reaction mixture. The phenol-polyol reaction mixture can further react with at least an aldehyde to form the modified phenolic novolak resin. Optionally, styrene can be added to the reaction to modify the properties of the modified phenolic novolak resin.

In general, the modified phenolic novolak resin disclosed herein is not substantially cross-linked after the reaction. The term "not substantially cross-linked" means that the degree of cross-linking is less than 10%, preferably less than about 5%, more preferably less than about 3% or further preferably less than about 1%. The degree of cross-linking of a resin refers to the weight percentage of the gel (i.e., the insoluble portion in a chosen solvent) in the resin.

In some embodiments, the phenolic compounds that can be used to prepare the modified phenolic novolak resin are represented by Formula (I)) as follows:

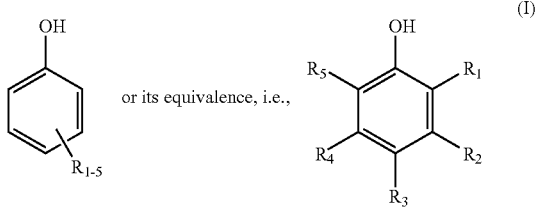

wherein $R_1$, $R_2$, $R_3$, $R_4$ and $R_5$ is designated as $R_{1-5}$ and each of $R_{1-5}$ is independently H, hydroxyl, thiol, amido, halogen, cyano, nitro, amino, acyl, alkyl, heteroalkyl, cycloalkyl, heterocycloalkyl, aryl, heteroaryl, aralkyl, alkenyl, alkynyl, alkoxy, aryloxy, acyloxy, acylamino, alkoxycarbonyl or a part of a ring where two of $R_1$, $R_2$, $R_3$, $R_4$ and $R_5$ together from the ring with the provisos that that at least two of $R_1$, $R_2$, $R_3$, $R_4$ and $R_5$ are H.

It is understood that $R_1$, $R_2$, $R_3$, $R_4$ and $R_5$ can be the same or different as defined above. In some embodiments, $R_1$, $R_2$, $R_3$, $R_4$ and $R_5$ are the same with the proviso that at least one of $R_{1-5}$ is H which may be same as or different from other $R_{1-5}$ groups. In one embodiment, each of $R_{1-5}$ is H. In another embodiment, $R_2$ is hydroxyl. In other embodiments, one of $R_1$, $R_3$ and $R_5$ is H and other four $R_{1-5}$ groups are independently the same or different as defined above.

In some embodiments, suitable phenolic compounds include, but are not limited to, unsubstituted phenol, substituted phenol, unsubstituted resorcinol or substituted resorcinol. Therefore, the term "phenolic novolak resin" or "phenolic novolak" used herein encompasses not only novolak resins based on unsubstituted and substituted phenols, but also those based on the phenolic compounds of Formula (I) including, inter alia, both unsubstituted and substituted resorcinols.

In some embodiments, the phenolic compounds for the preparation of phenolic novolak resins include, but are not limited to, mononuclear phenols with an aromatic nucleus to which at least one hydroxyl group is attached. Examples of mononuclear phenols include, but are not limited to, phenol itself and derivatives of phenol such as o-cresol, m-cresol, p-cresol, o-phenylphenol, p-phenylphenol, 3,5-xylenol, 3,4-xylenol, 3-ethylphenol, 3,5-diethylphenol, p-butylphenol, 3,5-dibutylphenol, p-amylphenol, p-cyclohexylphenol, p-octylphenol, p-nonylphenol, styrylphenol, 3,5-dicyclohexylphenol, p-crotylphenol, 3,5-dimethoxyphenol, 3,4,5-trimethoxyphenol, 3-methoxyphenol, p-ethoxyphenol, p-butoxy-phenol, 3-methyl-4-methoxyphenol, 3-hydroxybenzonitrile, 2,5-dihydroxybenzonitrile, 4-fluoro-3-methylphenol, 4-chloro-3-methylphenol, 4-nitrophenol, 3-hydroxybenzaldehyde, 3-hydroxyacetophenone, aminophenol, 3-(dimethylamino)phenol, sesamol, 4-(1H-pyrrol-1-yl)phenol, 4-(2-methoxyethyl)phenol, 1-acetyl-4-(4-hydroxyphenyl)piperazine and p-phenoxyphenol.

In other embodiments, the phenolic compounds for the preparation of phenolic novolak resins include, but are not limited to, derivatives of dihydroxy benzenes, trihydroxy benzenes and polyhydroxy benzenes, such as hydroquinone, catechol, 4-nitrocatechol, resorcinol, phloroglucinol, pyrogallol, 1,2,4-benzenetriol, 2-methyl-1,3,5-benzenetriol, 5-methyl-1,2,3-benzenetriol, 5-(hydroxymethyl)-1,3-benzenediol, 3,5-dihydroxybenzamide, 4-aminoresorcinol, 5-methylresorcinol, 5-ethylresorcinol, 5-propylresorcinol, 2-methylresorcinol, 4-methylresorcinol, 4-ethylresorcinol and 4-propylresorcinol.

In preferred embodiments, the phenolic compound for the preparation of phenolic novolak resins is an unsubstituted resorcinol or a substituted resorcinol. Non-limiting examples of substituted resorcinols include alkyl substituted resorcinols, aralkyl-substituted resorcinols and combinations thereof. Examples of suitable resorcinol compounds are disclosed in U.S. Pat. Nos. 4,892,908; 4,605,696; 4,889,891; and 5,021,522, which are incorporated by reference herein in their entirety.

In some embodiments, at least two phenolic compounds are used for the preparation of phenolic novolak resins. For example, the first phenolic compound can be phenol or substituted phenol; the second phenolic compound can be resorcinol or substituted resorcinol. In some instances, each of the first and second phenolic compounds is phenol or substituted phenol, provided that the two phenolic compounds are different. In other instances, each of the first and second phenolic compounds is resorcinol or substituted resorcinol, provided that the two phenolic compounds are different. Non-limiting examples of such combination include phenol/p-octyl phenol; phenol/resorcinol; phenol/cresol; p-butylphenol/phenol; cresol/resorcinol; etc.

In some embodiments, a mixture of the isomers of a phenolic compound, such as mixed cresol isomers and mixed xylenol isomers, or a phenolic blend such as those obtained from coal tar fractionation and cashew nut shell liquid, can be employed as all or part of the phenolic compound. In further embodiments, multiple ring phenols such as bisphenol-A types, 4,4'-dihydroxybiphenyl and naphthol can be used.

Any aliphatic polyol that reacts with a phenolic compound can be used for this invention. Non-limiting example of aliphatic polyols include aliphatic diols, aliphatic triols, aliphatic tetrols, aliphatic pentols and aliphatic hexols which have respectively 2 to 6 hydroxyl groups attached to an aliphatic chain.

In some embodiments, the aliphatic polyol for the preparation of the modified phenolic novolak resin is an aliphatic diol. Some non-limiting examples of aliphatic diols include ethylene glycol, propanediols, butanediols, petanediols, hexanediols, heptanediols, octanediols, nonanediols, decanediols, dodecanediols where the two hydroxyl groups can attach to any two carbon atoms in the backbone of the diols. For example, the butanediols can include 1,4-butanediol, 1,3-butanediol, 1,2-butanediol, 2,3-butanediol and 2,4-butanediol.

In some embodiments, the aliphatic diols can have at least a substituent. For example, petanediols can include 2-methyl-2,4-pentanediol, 3-methyl-1,5-pentanediol, 1-phenyl-1,5-pentanediol, 2,4-dimethyl-2-methoxymethyl-1,5-pentanediol, 2,2,4-trimethyl-1,3-pentanediol and 2,4,4-trimethyl-2,3-pentanediol. In other embodiments, the aliphatic polyol may comprise at least an unsaturation (e.g., a double bond or a triple bond) in the aliphatic chain. For example, petanediols include pent-2-yne-1,4-diol and pent-2-ene-1,4-diol.

In a further embodiment, the aliphatic diol is a pentanediol. Such pentanediol-modified phenolic novolak resin can be prepared by reacting a phenolic compound (i) with a pentanediol or a mixture of pentanediols in the presence of an acid catalyst, and then (ii) with an aldehyde compound. Non-limiting examples of the pentanediol suitable for this invention include 1,2-pentanediol, 1,4-pentanediol, 1,5-pentanediol, 2,4-pentanediol, 2,3-pentanediol, 1,3-pentanediol, pent-2-ene-1,4-diol, pent-2-yne-1,4-diol, 2-methyl-2,4-pentanediol, 2,4-dimethyl-2,4-pentanediol, 3-methyl-1,5-pentanediol, 1-phenyl-1,5-pentanediol, 2,4-dimethyl-2-methoxymethyl-1,5-pentanediol, 2,2,4-trimethyl-1,3-pentanediol and 2,4,4-trimethyl-2,3-pentanediol, all of which can be obtained commercially from a supplier such as Aldrich Chemicals or prepared by methods known to persons skilled in the art. In some embodiments, the pentanediol can have one or more $C_1$-$C_{12}$ alkyl substituents. Preferably, the pentanediol is 2,4-pentanediol, 2,3-pentanediol, 2-methyl-2,4-pentanediol, 2,4-dimethyl-2,4-pentanediol or 2,4,4-trimethyl-2,3-pentanediol. More preferably, the pentanediol is 2-methyl-2,4-pentanediol, 2,4-pentanediol or 2,3-pentanediol. Additional suitable pentanediols or derivatives thereof are disclosed in U.S. Pat. Nos. 6,296,858; 6,242,388; 6,072,089; 5,180,847; 4,605,795; and 4,110,539, which are incorporated by reference herein in their entirety.

In some embodiments, the phenolic compound is a resorcinol, the aldehyde is formaldehyde and the polyol is a pentanediol. The reactions can be done under atmospheric conditions. Scheme B below illustrates an example of such reactions where the pentanediol is 2-methyl-2,4-pentanediol and the catalyst is p-toluenesulfonic acid (PTSA).

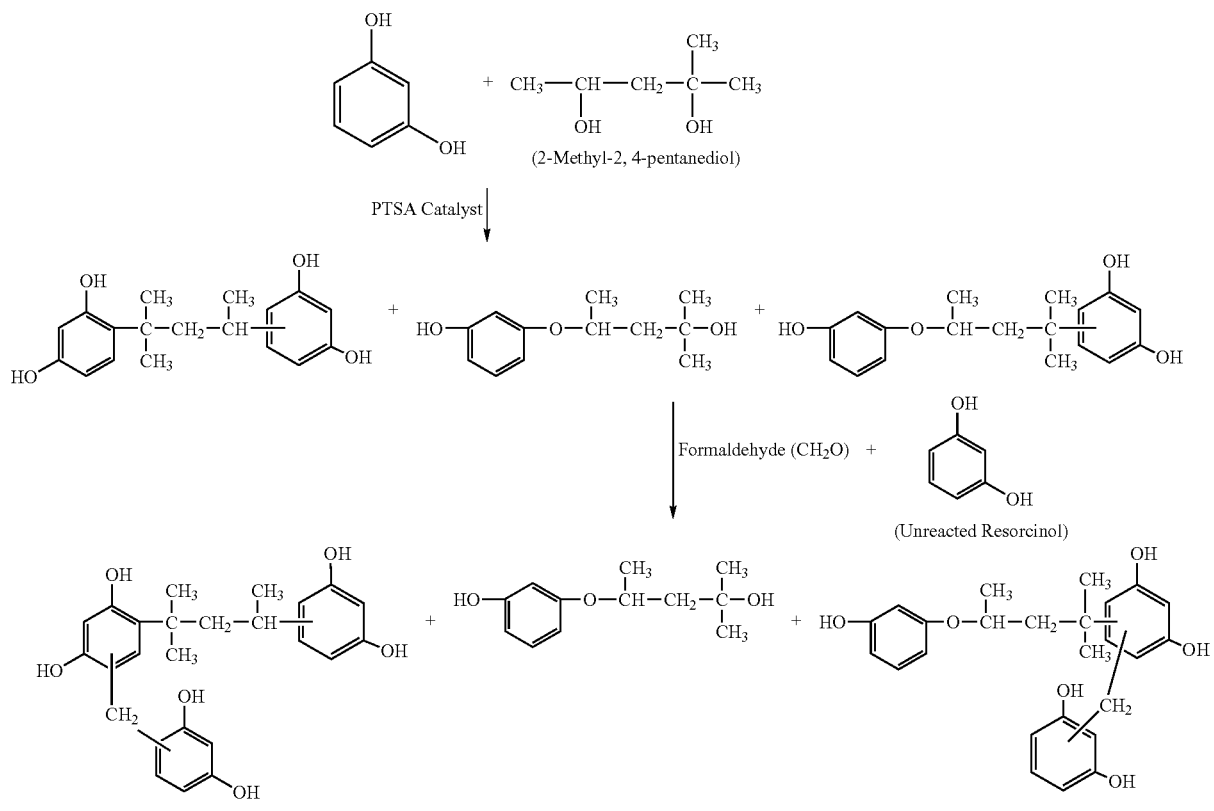

(Resin Structures of Pentanediol-Modified Resorcinol-Formaldehyde Resins)

In some embodiments, the modified phenolic novolak resins can be prepared by reacting resorcinol with 2-methyl-2,4-pentanediol and formaldehyde in the presence of PTSA wherein the mole ratio of formaldehyde to resorcinol is between about 1:1 and about 0.1:1, between less than 0.9:1 and about 0.1:1, between 0.89:1 and about 0.1:1, between about 0.85:1 and about 0.1:1, between about 0.7:1 to about 0.1:1, between about 0.7:1 and about 0.2:1, or between about 0.5:1 and about 0.2:1. In a further embodiment, such modified phenolic novolak resins contain less than 5 weight percent of free resorcinol. In another further embodiment, such modified phenolic novolak resins have a softening point between about 80° C. and 140° C., preferably between about 90° C. and 130° C., more between about 100° C. and 120° C.

While pentanediols are preferred, other aliphatic diols may also be used, such as propanediols, butanediols, hexanediols, heptanediols, octanediols, nonanediols and decanediols. Non-limiting examples of other aliphatic diols include 1,2-propanediol, 1,3-propanediol, 2-methyl-1,3-propanediol, 2-methyl-2-propyl-1,3-propanediol, 1,1-diphenyl-1,2-propanediol, 2,2-diethyl-1,3-propanediol, 2,2-dibutyl-1,3-propanediol, 2-ethyl-2-butyl-1,3-propanediol, 2-ethyl-2-methyl-1,3-propanediol, 1,4-butanediol, 1,3-butanediol, 1,2-butanediol, 2,3-butanediol, 2,4-butanediol, 2-methyl-1,4-butanediol, 2,3-diphenyl-2,3-butanediol, 3,3-dimethyl-1,2-butanediol, 1,2-hexanediol, 1,5-hexanediol, 1,6-hexanediol, 1,1,6,6-tetraphenyl-1,6-hexanediol, 2,5-dimethyl-2,5-hexanediol, 2,5-hexanediol, 2-ethyl-1,3-hexanediol, 3,4-diphenyl-3,4-hexanediol, 1,4-heptanediol, 1,7-heptanediol, 2,6-heptanediol, 3-methyl-2,4-heptanediol, 1,4-heptanediol, 1,2-octanediol, 1,8-octanediol, 2,7-dimethyl-2,7-octanediol, 2-butyl-1,3-octanediol, 3,6-dimethyl-3,6-octanediol, 3,6-octanediol, 1,3-nonanediol, 1,9-nonanediol, 5-ethyl-3-methyl-2,4-nonanediol, 7-ethyl-2-methyl-4,6-nonanediol, 1,10-decanediol, 1,2-decanediol, 1,12-dodecanediol and 1,2-dodecanediol, all of which can be obtained commercially from a supplier such as Aldrich Chemicals or prepared by methods known to persons skilled in the art.

In some embodiments, the mole ratio of the phenolic compound to the aliphatic diol is between about 1:0.3 and about 1:1, between about 1:0.3 and about 1:0.9, between about 1:0.3 and about 1:0.8, between about 1:0.3 and about 1:0.7, between about 1:0.3 and about 1:0.6, between about 1:0.4 and about 1:0.9, between about 1:0.4 and about 1:0.8, between about 1:0.4 and about 1:0.7, between about 1:0.4 and about 1:0.6, between about 1:0.5 and about 1:0.9, between about 1:0.5 and about 1:0.85, between about 1:0.5 and about 1:0.7 or between about 1:0.65 and about 1:0.85. The preferred mole ratio of the phenolic compound to the aliphatic diol is between about 1:0.65 and about 1:0.85.

One skilled in the art can recognize that one mole of diol is equivalent to 1.5, 2 or 2.5 moles of triols, tetrols or pentols respectively. Therefore, the mole ratio of diol to phenolic compound can be applied to triols, tetrols or pentols respectively if the ratio is decreased by a factor of 1.5, 2 or 2.5 respectively.

In other embodiments, the aliphatic polyol for the preparation of the modified phenolic novolak resin is an aliphatic triol. Non-limiting examples of aliphatic triols include 1,2,3-propanetriol, 1,2,4-butanetriol, 3-methyl-1,3,5-pentanetriol, 1,2,3-hexanetriol, 1,2,6-hexanetriol, 2,5-dimethyl-1,2,6-hexanetriol, 1,2,3-heptanetriol, 1,2,3-octanetriol, 2-hydroxymethyl-1,3-propanediol, 4-(alpha-hydroxybenzyl)-4-phenyl-1,7-heptanediol, methyl pentofuranoside and 4-(1-hydroxyethyl)-4-phenyl-1,7-heptanediol, all of which can be obtained commercially from a supplier such as Aldrich Chemicals or prepared by methods known to persons skilled in the art.

In further embodiments, the aliphatic polyol for the preparation of the modified phenolic novolak resin is an aliphatic tetrol or pentol. Non-limiting examples of aliphatic tetrols and aliphatic pentols include pentose, pentopyranose, 6-deoxyhexopyranose, 2,5-anhydrohexitol, 1,5-anhydrohexitol, 6-deoxyhexose, 1-deoxyhexitol and pentitol, all of which can be obtained commercially from a supplier such as Aldrich Chemicals or prepared by methods known to persons skilled in the art.

Suitable aldehydes for the preparation of the modified phenolic resins include any aldehyde that can react with a phenolic compound. Non-limiting examples of suitable aldehydes are represented by the formula: R—CH=O, wherein R is H, alkyl having 1-20 carbon atoms, aryl having 6-20 carbon atoms, aralkyl having 7-20 carbon atoms, heteroaryl, alkenyl or aralkenyl. For example, R can be methyl, ethyl, propyl, isopropyl, butyl, isobutyl, pentyl, isopentyl, hexyl, octyl, nonyl, decyl, benzyl, etc. Other non-limiting examples of suitable aldehydes are represented by the formula: O=CH—R'—CH=O, wherein R' is a bond, alkylene or arylene. For example, R' can be methylene, ethylene, propylene, butylene or phenylene. In some embodiments, the R or R' groups can have at least a substituent such as halogens. More non-limiting examples of suitable aldehydes for this invention include formaldehyde, acetaldehyde, propionaldehyde, butyraldehyde, iso-butyraldehyde, n-valeraldehyde, benzaldehyde, crotonaldehyde, cinnamaldehyde, glyoxal, glutaraldehyde, furfural, phenylacetaldehyde, chloral, chloroacetaldehyde, dichloroacetaldehyde, laurylaldehyde, palmitylaldehyde, stearylaldehyde and mixtures thereof.

Unless it is otherwise stated, formaldehyde for this invention includes not only formaldehyde solutions or gas, but also any sources of formaldehyde, such as paraformaldehyde, trioxane and tetraoxane, that can generate formaldehyde (HCHO) at room temperature or upon heating.

While aldehyde is preferred, any ketone that can react with a phenolic compound can be used. Non-limiting examples of suitable ketones include acetone and methyl ethyl ketone.

In some embodiments, at least two different kinds of aldehydes are used simultaneously or sequentially. The first and second aldehyde can be any of the above aldehyde compounds, so long as they are different. Preferably, the first kind is formaldehyde. The second kind of aldehyde can be an aldehyde with at least 3 carbon atoms per molecule. One class of such aldehydes is represented by Formula (II):

$$R_6-CH=O \quad (II)$$

wherein $R_6$ is alkyl having at least 2 carbon atoms, aryl having at least 6 carbon atoms, aralkyl having at least 7 carbon atoms, heteroaryl, alkenyl or aralkenyl. For example, $R_6$ can be ethyl, propyl, isopropyl, butyl, isobutyl, pentyl, isopentyl, hexyl, octyl, nonyl, decyl, benzyl, etc. In some embodiments, the second aldehyde is an alkyl aldehyde with at least 4 carbon atoms per molecule, such as n-butyraldehyde or isobutyraldehyde. In other embodiments, the second aldehyde is an alkyl aldehyde with at least 5, 6, 7, 8, 9 or 10 carbon atoms per molecule, such as valeraldehyde, laurylaldehyde, palmitylaldehyde or stearylaldehyde. In some other embodiments, the second aldehyde is a mixture of two or more aldehydes as described above. The use of two aldehydes in the preparation of a phenolic resin is disclosed in U.S. application Ser. No.

10/368,753, filed on Feb. 18, 2003. The disclosure of this application is incorporated into reference herein in its entirety.

In the condensation reaction of a phenolic compound with an aliphatic polyol and an aldehyde, a catalyst, such as an acid catalyst and a base catalyst, may be used to accelerate the reaction. Examples of the catalyst include, but are not limited to, acetic acid, oxalic acid, p-toluenesulfonic acid, benzoic acid, propionic acid and like organic acids; as well as metallic catalysts such as lithium, sodium, potassium, calcium, barium, and zinc. In some embodiments, the condensation reaction disclosed herein is free of a metal salt or a metallic derivative (e.g., $C_{1-20}$ carboxylic acid salts of the group of divalent metal ions consisting of those of Mg, Ca, Mn, Fe, Co, Ni, Zn, Cd, Ba, and Pb (with or without added PbO); $C_{1-20}$ carboxylic acid salts of divalent dialkyltin where the alkyl groups each contain 1 to 5 carbon atoms; alkyl ortho-titanates; and the like). In some embodiments, the condensation reaction disclosed herein is free of lead naphthenate (with or without added PbO), zinc neodecanoate, cobalt naphthenate, tetrabutyl titanate, tetraoctyl titanate, manganese valerate, ferrous lactate, cadmium acetate, zinc benzoate, zinc acetate, dibutyltin dilaurate, dimethyltin diactate, or lead butyrate.

In some embodiments, the catalyst is an acid catalyst. The acid catalyst can be an inorganic acid, an organic acid or a combination thereof. Non-limiting examples of suitable inorganic acids include sulfuric acid, hydrochloric acid, nitric acid, phosphoric acid, and combinations thereof. All of the above-mentioned acids can be obtained commercially from a supplier such as Aldrich Chemicals.

Other non-limiting examples of suitable organic acids include formic acid, acetic acid, propanoic acid, butanoic acid, pentanoic acid, hexanoic acid, oxalic acid, malonic acid, succinic acid, glutaric acid, adipic acid, benzoic acid, phthalic acid, 4-nitrobenzoic acid, 4-(trifluoromethyl)benzoic acid, benzenesulfonic acid, benzene-1,2-disulfonic acid, benzene-1,3-disulfonic acid, benzene-1,4-disulfonic acid, p-toluenesulfonic acid, xylenesulfonic acid, 2,4,6-trimethylbenzenesulfonic acid, methanesulfonic acid, 4-chlorobenzenesulfonic acid and combinations thereof. All of the above-mentioned organic acids can be obtained commercially from a supplier such as Aldrich Chemicals.

In some embodiments, the modified phenolic novolak resin is prepared by a process comprising reacting a phenolic compound with an aliphatic polyol and an aldehyde in the presence of an acid catalyst wherein the pH of the reaction mixture (i.e., the phenolic compound, the aliphatic polyol, and the aldehyde) is less than 7, preferably less than 6, more preferably less than 5, and further preferably less than 4.

In other embodiments, the acid catalyst is selected from the group consisting of benzenesulfonic acid, benzene-1,2-disulfonic acid, benzene-1,3-disulfonic acid, benzene-1,4-disulfonic acid, p-toluenesulfonic acid, xylenesulfonic acid, 2,4,6-trimethylbenzenesulfonic acid, methanesulfonic acid, 4-chlorobenzenesulfonic acid and combinations thereof.

To prepare the modified phenolic novolak resin, the phenolic compound can react with at least an aldehyde such as formaldehyde. This phenolic compound-aldehyde reaction can take place either before or after the phenolic compound reacts with an aliphatic polyol such as a pentanediol. It is preferred that the phenolic compound-aldehyde reaction takes place after the phenolic compound-polyol reaction. The condensation reaction of the phenolic compound with the aldehyde may be carried out with or without a catalyst. The preferred method is to carry out the reaction in the presence of a conventional acid catalyst. Examples of suitable acid catalysts are set forth above. The phenolic compound-aldehyde reaction is preferably carried out in the temperature range of 50® C., preferably 85° C. to 175° C., more preferably 90° C. to 130° C.

The use of a solvent is optional and suitable solvents are the same as set forth earlier. The solvent is not particularly limited insofar as it can dissolve the modified phenolic novolak resin. Non-limiting examples of such solvents include non-interacting solvents such as toluene, xylene, cyclohexane, and the like. If the rapid progress of dealcoholization reaction is desired, the reaction is preferably performed without the solvent. However, it is favorable to use a solvent when the viscosity of the reaction system is excessively increased during the reaction.

In some embodiments, the phenol compound is resorcinol and the aliphatic polyol is a pentanediol. In other embodiments, resorcinol and the pentanediol are reacted at a mole ratio of 1 mole of resorcinol to 0.7 to 0.8 moles of pentanediol in the presence of an acid catalyst at about 120° C. Thereafter, formaldehyde is added at a mole ratio of 1 mole of resorcinol to 0.2 to 0.9 moles of formaldehyde. The reaction mixture is reacted at about 100° C., after which the reaction product is dehydrated.

In other embodiments, resorcinol and formaldehyde are reacted at a mole ratio of 1 mole of resorcinol to 0.2 to 0.5 moles of the total aldehyde at about 100° C. The resorcinol-formaldehyde reaction product is then dehydrated at atmospheric pressure at 140° C. A pentanediol at a mole ratio of 0.65 to 0.85 is then added to complete the reaction at 140-150° C. Both reactions are run in the presence of suitable acid catalysts.

As mentioned above, a vulcanizable rubber composition can be prepared by using the modified phenolic novolak resin as the methylene acceptor. The vulcanizable rubber composition comprises: (I) a rubber component (which can be natural or synthetic rubber); and (II) a methylene donor compound which generates formaldehyde by heating; and (III) a methylene acceptor which is based on the modified phenolic novolak resin described herein. Optionally, the rubber composition may further comprise (IV) a vulcanizing agent, such as sulfur; and (V) one or more rubber additives.

The rubber component can be any natural rubber, synthetic rubber or combination thereof. Specific examples of synthetic rubbers include neoprene (polychloroprene), polybutadiene, polyisoprene, butyl rubber, copolymers of 1,3-butadiene or isoprene with monomers such as styrene, acrylonitrile and methyl methacrylate as well as ethylene/propylene/diene monomer (EPDM) and in particular ethylene/propylene/dicyclopentadiene terpolymers.

The methylene donor component can be any compound that generates formaldehyde upon heating during the vulcanization and capable of reacting with the methylene acceptor used in the rubber compound formulations. Examples of suitable methylene donors include, but are not limited to, hexamethylenetetramine (HEXA or HMTA) and hexamethoxymethylmelamine (HMMM). Other suitable methylene donors are described in U.S. Pat. No. 3,751,331, which is incorporated by reference herein in its entirety. The methylene donor is usually present in concentrations from about 0.5 to 15 parts per one hundred parts of rubber, preferably from 0.5 to 10 parts per one hundred parts of rubber. The weight ratio of methylene donor to methylene acceptor may vary. But, in general, the weight-ratio will range from 1:10 to 10:1. Preferably, the weight ratio of methylene donor to methylene acceptor ranges from 1:3 to 3:1.

The vulcanizable rubber composition may include a vulcanizing agent, such as sulfur. Examples of suitable sulfur vulcanizing agents include elemental sulfur or sulfur-donating vulcanizing agents. Preferably, the sulfur vulcanizing agent is elemental sulfur. Other cross-linking agents may also be used.

The vulcanizable rubber composition may also include one or more additives used in rubber compositions. The additives commonly used in the rubber stocks include carbon black, cobalt salts, stearic acid, silica, zinc oxide, fillers, plasticizers, waxes, processing oils, retarders, antiozonants, accelerators, and the like.

Accelerators are also used to control the time and/or temperature required for the vulcanization and to improve the properties of the vulcanizate. Suitable accelerators include, but are not limited to, amines, disulfides, guanidines, thioureas, thiazoles, thiurams, sulfenamides, dithiocarbonates and zanthates. Preferably, the primary accelerator is a sulfenamide.

Embodiments of the invention also provide a method for improving the adhesion of rubber to reinforcing materials, thus a method of making a fabricated rubber article due to the improved adhesion between rubber and a reinforcing material. The method comprises (i) mixing a cross-linking agent with a vulcanizable rubber composition made in accordance with an embodiment of the invention as described above; (ii) embedding a reinforcing material in the vulcanizable rubber composition before the rubber composition is cross-linked; and (iii) effecting cross-linking of the rubber composition. The reinforcing material may or may be not coated with a silane composition before the embedding. In other words, the reinforcing material is substantially free of a silane coating before the embedding in certain embodiments. The term "embedding" means that the reinforcing material is combined with a rubber composition in any suitable manner, such as laminating, calendering, mixing, etc. While it is preferred to have the reinforcing material closely enclosed in a matrix of the rubber composition, it need not be the case. While the modified phenolic novolak resin is not substantially cross-linked before it is used in a rubber composition, it should be understood that it becomes cross-linked when the rubber composition is vulcanized.

The reinforcing material can be in the form of cords, wires, fibers, filaments, fabrics, etc. Examples of suitable reinforcing materials include, but are not limited to steel (which can be coated by brass, zinc or bronze), polyester, nylon, aramid, fiberglass and other organic or inorganic compositions.

While not necessary, the reinforcing material can be coated with an adhesive composition before it is combined with an uncured rubber composition. Any adhesive composition that enhances the adhesion between the reinforcing material and the cured rubber component can be used. For examples, certain suitable adhesive compositions for enhancing the adhesion between rubber and a reinforcing material are disclosed in the following U.S. Pat. Nos. 6,416,869; 6,261,638; 5,789,080; 5,126,501; 4,588,645; 4,441,946; 4,236,564; 4,051,281; 4,052,524; and 4,333,787, all of which are incorporated by reference herein in their entirety. These adhesive compositions can be used according to the methods taught therein, with or without modifications.

The rubber compositions based on the above resins may be used in the manufacture of composite products such as tires, power belts, conveyor belts, printing rolls, rubber shoe heels and soles, rubber wringers, automobile floor mats, mud flaps for trucks, ball mill liners and the like. The rubber compositions described herein also may be used as a wire coat or bead coat for use in tire applications. Any form of cobalt compounds known in to promote the adhesion of rubber to metal, such as stainless steel, may be used. Suitable cobalt compounds include, but are not limited to, cobalt salts of fatty acids, such as stearic acid, palmitic, oleic, linoleic and the like; cobalt salts of aliphatic or alicyclic carbocylic acids having 6 to 30 carbon atoms; cobalt chloride, cobalt naphthenate, cobalt neodeconoate and an organo-cobalt-boron complex commercially available under the trade name MANOBOND® 680C from OM Group, Inc., Cleveland, Ohio.

The following examples are presented to exemplify embodiments of the invention. All numerical values are approximate. When numerical ranges are given, it should be understood that embodiments outside the stated ranges may still fall within the scope of the invention. Specific details described in each example should not be construed as necessary features of the invention.

EXAMPLES

In the following examples, polyol-modified phenolic novolak resins where the phenolic compound was resorcinol, the aldehyde was formaldehyde and the polyol was a pentanediol were prepared substantially according to Scheme C below. Additional information about the reaction scheme can be found in the following examples.

SCHEME C

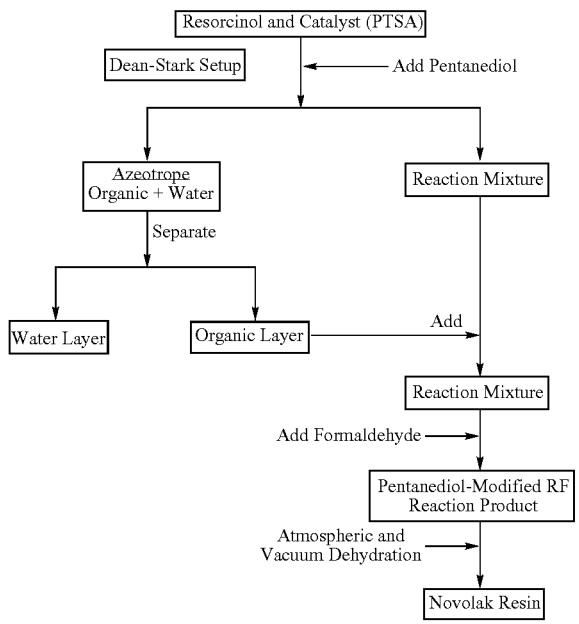

Example 1

A mixture of resorcinol (143.1 grams, 1.3 mole) and p-toluenesulfonic acid (2.6 grams) was charged into a 500 ml reaction kettle equipped with a stirrer, a thermometer, a reflux condenser, and an addition fuel and the mixture was heated to melt all the resorcinol. After the temperature of the resorcinol solution was adjusted to 130-140° C., 2-methyl-2,4-pentanediol (108.6 grams, 0.91 moles) was added dropwise over a period of 60-120 minutes at 135-145° C. During the addition, the reaction reached reflux conditions. Upon the completion of the 2-methyl-2,4-pentanediol addition, the reaction was held for 60 minutes under reflux conditions. After refluxing, the reaction was cooled to 95-105° C. and a 37.7% formaldehyde solution (31.1 grams, 0.39 moles) was added dropwise over 30-60 minutes under reflux conditions.

After the formaldehyde addition, the reaction was refluxed for 60 minutes. After the reaction was cooled to 90-95° C., an aqueous solution of 50% sodium hydroxide (1.2 grams) was added to neutralize the acid catalyst. The reaction temperature was increased to remove water distillate under atmospheric pressure and then under reduced pressure. The final product had a softening point of 107.3° C. and a free resorcinol content of 3.3 weight percent by GC/LC analysis. Carbon-13 NMR analysis revealed chemical shifts characteristic of a mixture of substituted resorcinols, free resorcinol (minor), methylene-bridged resorcinols, aliphatic hydrocarbon structures, aryl-CH, aryl-O—CH, and HO—CH structures. It was found that a majority of the —OH groups of the pentanediol had reacted with the resorcinol to form alkylation products. A carbon-13 NMR analysis revealed the following structures shown in Table 1:

TABLE 1

| Carbon Type | Mole Ratio |
| --- | --- |
| Aliphatic carbons not attached to oxygen (includes methylene bridges) | 90 |
| Aliphatic carbons attached to oxygen | 10 |

Example 2

A mixture of resorcinol (143.1 grams, 1.3 mole) and p-toluenesulfonic acid (2.6 grams) was charged into a 500 ml reaction kettle equipped with a stirrer, a thermometer, a reflux condenser, a Dean-Stark trap and an addition funnel and the mixture was heated to melt all the resorcinol. After the temperature of the resorcinol solution was adjusted to 150-160° C., 2-methyl-2,4-pentanediol (124.2 grams, 1.04 moles) was added dropwise over a period of 90-150 minutes at 150-155° C. The azeotropic distillate formed from the reaction was collected in the Dean-Stark trap. Upon the completion of the 2-methyl-2,4-pentanediol addition, the reaction was held at 150-155° C. for 60-120 minutes or until the distillate stopped coming over. The reaction was cooled to 115-125° C. and a 37.6% formaldehyde solution (26.0 grams, 0.325 moles) was added dropwise over 30-60 minutes under reflux conditions. After the formaldehyde addition, the reaction was refluxed for 60 minutes. After the reaction was cooled to 90-95° C., an aqueous solution of 50% sodium hydroxide (1.3 grams) was added to neutralize the acid catalyst. The reaction temperature was increased to remove water distillate under atmospheric pressure and then under reduced pressure. The final product had a softening point of 115.4° C. with a free resorcinol content of 1.8 weight percent and a free pentanediol content of <0.01 weight percent by GC/LC analysis.

Example 3

A mixture of resorcinol (143.1 grams, 1.3 mole) and p-toluenesulfonic acid (2.6 grams) was charged into a 500 ml reaction kettle equipped with a stirrer, a thermometer, a reflux condenser, a Dean-Stark trap and an addition funnel and the mixture was heated to melt all the resorcinol. After the temperature of the resorcinol solution was adjusted to 150-160° C., 2-methyl-2,4-pentanediol (124.2 grams, 1.04 moles) was added dropwise over a period of 90-150 minutes at 150-155° C. The azeotropic distillate formed from the reaction was collected in the Dean-Stark trap. Upon the completion of the 2-methyl-2,4-pentanediol addition, the reaction was held at 150-155° C. for 60-150 minutes or until the distillate stopped coming over to the Dean-Stark trap. A two-phase azeotrope was produced during the reaction. The bottom phase of the azeotrope was identified by IR/NMR as low molecular weight resorcinol/2-methyl-2,4-pentanediol reaction products while the top layer consisted primarily of 2-methyl-1-pentene-4-ol. The reaction was heated back to 150-160° C. and the top layer of the azeotrope was added dropwise to the reaction over 15-30 minutes. The distillate was again collected in the Dean Stark trap. After addition, the reaction was maintained at 155-160° C. for 30-60 minutes or until the distillate stopped coming over. The Dean-Stark trap was removed and replaced with a reflux condenser. The reaction was cooled to 115-125° C. and 23.4 grams (0.293 moles) of 37.6% formaldehyde was added dropwise over 30-60 minutes under reflux conditions. After formaldehyde addition, the reaction was held at reflux for 60 minutes. The reaction was cooled to 90-95° C. and 1.3 grams of 50% sodium hydroxide was added to neutralize the acid catalyst. The reaction temperature was increased to remove water distillate under atmospheric pressure and then under reduced pressure. The final product had a softening point of 103.7° C. with a free resorcinol content of 2.7 weight percent and a free pentanediol content of <0.01 weight percent by GC/LC analysis. A proton NMR analysis revealed the following structures shown in Table 2:

TABLE 2

| Structure | Numbers Per Resorcinol Ring |
| --- | --- |
| Aromatic Protons | 2.71 |
| Methylene bridges | 0.53 |
| Total MPD structures | 0.76 |

2-Methyl-2,4-pentanediol (MPD) generally reacts with phenol at the carbons in the 2- and 4-positions to which the two hydroxyl groups attach. A carbon-13 NMR analysis focusing on these positions revealed the following structures shown in Table 3.

TABLE 3

| Structure at the 2- and 4-Carbons of MPD | Mole Ratio |
| --- | --- |
| C—O carbons, aryl ether | 23 |
| C—O carbons, 3° alcohol | 26 |
| C—O carbons, 2° alcohol | None Detected |
| C-aryl carbons (alkylation products w.r.t. the aryl ring of resorcinol) | 51 |

The data in Table 3 indicate that 51% of the 2- and 4-carbons of MPD are present as "alkylation products" where the MPD is alkylated to the aryl ring of the resorcinol, and that 49% of the 2- and 4-carbons are present as ether and unreacted alcohol structures.

Table 4 shows the fuming or volatility of PENACOLITE® Resin B-1A (commercially available from INDSPEC, Pittsburgh, Pa.) and the resins of Examples 1-3. The fuming or volatility of the resins were determined by thermogravimetric analysis (TGA) in which the samples were heated at a rate of 10° C./minute under a nitrogen atmosphere. The temperature at which the resin started to lose weight was measured and used as an indication of the volatility of the resin.

TABLE 4

Fuming or Volatility Results

| Temperature (° C.) | Sample Weight Loss (%) | | | |
|---|---|---|---|---|
| | PENACOLITE ® Resin B-1A | Example 1 | Example 2 | Example 3 |
| 125 | 1.3 | 0.6 | 0.3 | 0.3 |
| 150 | 2.1 | 1 | 0.6 | 0.9 |
| 175 | 3.9 | 2.4 | 1.4 | 2.6 |
| 200 | 7.3 | 6 | 3.8 | 6.4 |

Rubber Compounding and Testing

Each of Examples 1-3 was evaluated as a methylene acceptor resin in a black natural rubber composition to assess its performance in improving the steel-wire adhesion properties under heat- and humidity-aged conditions. Four rubber compositions, each comprising a different methylene acceptor in the same general formulation as shown in Table 5, were prepared in a 3-stage mixing procedure. The rubber compositions were then used to evaluate the adhesion effects of Examples 1-3 as methylene acceptor resins in combination with the methylene donor hexamethoxymethylmelamine (HMMM). The methylene acceptor/donor ratio was kept at 3:2 with a combined loading of 5 parts by weight in each formulation.

TABLE 5

Rubber Composition Formulation

| Stages and Ingredients | Parts by Weight |
|---|---|
| First Stage | |
| 1. Natural Rubber | 100 |
| 2. Carbon Black | 55 |
| 3. Zinc Oxide | 8 |
| 4. Stearic Acid | 1 |
| 5. N-(1,2-Dimethylbutyl)-N'-Phenyl-p-Phenylenediamine | 2 |
| 6. Pre-Vulcanization Inhibitor [N-(Cyclohexylthio)phthalimide] | 0.2 |
| 7. Polymerized 1,2-Dihydro-2,2,4-Trimethylquinoline | 1 |
| Second Stage | |
| 8. Methylene Acceptor (Phenolic/Resorcinolic Resin) | 3 |
| 9. Cobalt Salt (Manobond 680 C., 22% Co) | 0.45 |
| Third Stage (Final) | |
| 10. Insoluble Sulfur (80%, oiled) | 5 |
| 11. N,N-Dicylohexyl-2-Benzenethiazole Sulfenamide | 1 |
| 12. Methylene Donor (HMMM, 72% Active) | 2.78 |

The rubber compositions were prepared according to the following procedure. In the first stage, all the ingredients were mixed to about 150° C. temperature in a Banbury mixer to produce a masterbatch. In the second stage, a methylene acceptor (i.e., Examples 1-3 or PENACOLITE® Resin B-1A) and a cobalt salt were added to the masterbatch on a two-roll mill at about 121° C. In the third stage, insoluble sulfur, an accelerator and a methylene donor (i.e., HMMM) were mixed with the mixture from the second stage at 95° C. The rubber compositions were conditioned overnight in a constant temperature room at about 23° C. and 50% relative humidity. The rubber compositions were then tested for rheometer cure, shaped and optimum cured at 150° C. for the evaluation of the wire adhesion and mechanical properties.

Cure properties were measured with an Alpha Technologies MDR Rheometer at 150° C., 0.5° arc and 1.67 Hz according to ASTM D 5289. Wire pullout adhesion was determined for each test compound by ASTM D 2229-02 using brass plated steel cord with 63.7% copper plating embedded 19 mm into the rubber pad. Both ASTM D 5289 and ASTM D 2229-02 are incorporated by reference herein in their entirety.

The softening point of the resins was measured according to the following method with reference to the latest edition of ASTM E 28 and ASTM D 3104, which are incorporated by reference herein in their entirety.

The apparatus for the softening point measurement included a Mettler softening point apparatus comprising (1) a control unit Model FP-90 or equivalent, (2) a furnace Model FP-83 or equivalent, and (3) cartridge assemblies; a timer; porcelain evaporating dishes (about 3" in diameter); and a hot plate. The testing used cups of pitch type drilled to 0.257" opening (F drill) and a 440 stainless steel ball (0.2500" in diameter and must pass through cups). The calibration of the Mettler apparatus was done according to ASTM D 3104, which is incorporated by reference herein in its entirety.

The procedure for the softening point measurement is as follows. A resin sample (~15 grams) was melted in a porcelain or aluminum evaporating dish on the surface of a hot plate at 600-650° F. The melting time was approximately 4 minutes. After the resin sample was melted, it was poured into cups that had been preheated to at least the temperature of the molten resin. The quantity of resin sample poured into the cups was such that after solidification the excess could be removed with a heated spatula or putty knife. After the sample was cooled to room temperature in a desiccator, the cartridge was assembled So that the ball rests on the top of the resin. The assembled cartridge was place in the furnace, which had been preset to 85° C. or 10-15° C. below the expected softening point. The heating rate was at 1° C./min. The cartridge was turned until it locked into position. After 30 seconds, the operation of softening point apparatus was initiated. The completed softening point on the indicator was read.

Table 6 illustrates the cure behavior, wire adhesion, physical and mechanical properties of the cured rubber compositions comprising the methylene acceptor resins of Examples 1-3 and PENACOLITE® Resin B-1A.

TABLE 6

Rubber Properties of Examples 1-3 and PENACOLITE ® Resin B-1A

| | Penacolite ® | Experimental Samples | | |
|---|---|---|---|---|
| Methylene Acceptor | Resin B-1A | Example 1 | Example 2 | Example 3 |
| Methylene Donor | HMMM | HMMM | HMMM | HMMM |
| Weight Ratio - Acceptor:Donor, phr | 3.0:2.0 | 3.0:2.0 | 3.0:2.0 | 3.0:2.0 |
| Mooney Viscosity (100° C.), $M_L$ 1 + 4 | 60 | 51 | 52 | 50 |

TABLE 6-continued

Rubber Properties of Examples 1-3 and PENACOLITE ® Resin B-1A

| Methylene Acceptor | Penacolite ® Resin B-1A | Experimental Samples | | |
|---|---|---|---|---|
| | | Example 1 | Example 2 | Example 3 |
| Rheometer Cure at 150° C. | | | | |
| $M_H$, dN-m | 35.94 | 33.6 | 30.94 | 32.03 |
| $M_L$, dN-m | 2.94 | 2.36 | 2.37 | 2.32 |
| ts2, minutes | 1.9 | 3.63 | 3.95 | 3.85 |
| t' 90, minutes | 14.99 | 19.82 | 20.59 | 20.39 |
| Wire Adhesion, N (% Rubber Coverage) | | | | |
| Unaged | 1143 (90) | 1228 (85) | 1081 (80) | 1149 (85) |
| Steam, 24 Hours at 120° C. | 1079 (85) | 1436 (95) | 1398 (95) | 1411 (95) |
| Humidity, 21 Days, 85° C./95% RH | 1303 (90) | 1236 (100) | 1253 (100) | 1196 (100) |
| Dynamic Mechanical Properties 2% Strain at RT | | | | |
| Storage Modulus, G' (MPa) | 13.06 | 15.48 | 14.44 | 15.16 |
| Tan Delta, δ | 0.202 | 0.2 | 0.201 | 0.2 |
| 2% Strain at 60° C. Temperature | | | | |
| Storage Modulus, G' (MPa) | 11.92 | 13.68 | 12.77 | 13.3 |
| Tan Delta, δ | 0.175 | 0.172 | 0.176 | 0.176 |
| Tensile Properties | | | | |
| 100% Modulus, MPa | 4.63 | 4.42 | 4.24 | 4.4 |
| Tensile Strength, MPa | 26.7 | 25.4 | 24.9 | 24.4 |
| Elongation, % | 455 | 454 | 460 | 439 |
| Die-C Tear Properties | | | | |
| Strength, kN/m | 103 | 130 | 112 | 115 |
| Energy to Peak Load (N-m) | 15.8 | 30.2 | 21 | 22 |

The data in Table 6 suggest that the use of modified phenolic novolak resins (i.e., Examples 1-3) in the rubber compounds may have one or more of the following advantages: a low free resorcinol content; low fuming; a lower Mooney viscosity for easier processing; better dynamic stiffness properties (G'), and/or good tear properties.

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. The method of making the resins is described as comprising a number of acts or steps. These steps or acts may be practiced in any sequence or order unless otherwise indicated. Finally, any number disclosed herein should be construed to mean approximate, regardless of whether the word "about" or "approximately" is used in describing the number. The appended claims intend to cover all those modifications and variations as falling within the scope of the invention.

What is claimed is:

1. A modified phenolic novolak resin obtained by reacting a phenolic compound with an aliphatic polyol and an aldehyde in the presence of an acid catalyst at a pH less than 7.

2. The modified phenolic novolak resin of claim 1, wherein the mole ratio of the aldehyde to the phenolic compound is less than 0.9:1.

3. The modified phenolic novolak resin of claim 1, wherein the mole ratio of the aldehyde to the phenolic compound is less than 0.8:1.

4. The modified phenolic novolak resin of claim 1, wherein the mole ratio of the aldehyde to the phenolic compound is between about 0.2:1 and about 0.5:1.

5. The modified phenolic novolak resin of claim 1, wherein the acid catalyst is selected from the group consisting of benzenesulfonic acid, benzene-1,2-disulfonic acid, benzene-1,3-disulfonic acid, benzene-1,4-disulfonic acid, p-toluenesulfonic acid, xylenesulfonic acid, 2,4,6-trimethylbenzenesulfonic acid, oxalic acid, methanesulfonic acid, 4-chlorobenzenesulfonic acid and combinations thereof.

6. The modified phenolic novolak resin of claim 1, wherein the pH is less than 4.

7. The modified phenolic novolak resin of claim 1, wherein the phenolic compound is represented by Formula (I)

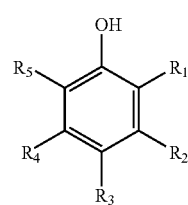

(I)

wherein each of $R_1$, $R_2$, $R_3$, $R_4$ and $R_5$ is independently H, hydroxyl, thiol, amido, halogen, cyano, nitro, amino, acyl, alkyl, heteroalkyl, cycloalkyl, heterocycloalkyl, aryl, heteroaryl, aralkyl, alkenyl, alkynyl, alkoxy, aryloxy, acyloxy, acylamino, alkoxycarbonyl or a part of a ring where two of $R_1$, $R_2$, $R_3$, $R_4$ and $R_5$ together from the ring with the proviso that at least two of $R_1$, $R_2$, $R_3$, $R_4$ and $R_5$ are H.

8. The modified phenolic novolak resin of claim 7, wherein $R_2$ is hydroxyl.

9. The modified phenolic novolak resin of claim 1, wherein the phenolic compound is an unsubstituted resorcinol or a substituted resorcinol.

10. The modified phenolic novolak resin of claim 1, wherein the aliphatic polyol is an aliphatic diol.

11. The modified phenolic novolak resin of claim 10, wherein the mole ratio of the phenolic compound to the aliphatic diol is between about 1:0.3 and about 1:1.5.

12. The modified phenolic novolak resin of claim 10, wherein the mole ratio of the phenolic compound to the aliphatic diol is between about 1:0.65 and about 1:0.85.

13. The modified phenolic novolak resin of claim 10, wherein the aliphatic diol is a pentanediol.

14. The modified phenolic novolak resin of claim 13, wherein the pentanediol is selected from the group consisting of 2,4-pentanediol, 2,3-pentanediol, 2-methyl-2,4-pentanediol, 2,4-dimethyl-2,4-pentanediol and 2,4,4-trimethyl-2,3-pentanediol.

15. The modified phenolic novolak resin of claim 1, wherein the aldehyde is formaldehyde, acetaldehyde, propionaldehyde, butyraldehyde, iso-butyraldehyde, n-valeraldehyde, benzaldehyde, crotonaldehyde, cinnamaldehyde, glyoxal, glutaraldehyde, furfural, phenylacetaldehyde, chloral, chloroacetaldehyde, dichloroacetaldehyde, laurylaldehyde, palmitylaldehyde, stearylaldehyde or a combination thereof.

16. The modified phenolic novolak resin of claim 1, wherein the aldehyde is formaldehyde, the phenolic compound is resorcinol and the polyol is 2-methyl-2,4-pentanediol.

17. The modified phenolic novolak resin of claim 16, wherein the modified phenolic novolak resin has a free resorcinol content of less than 5 weight percent.

18. The modified phenolic novolak resin of claim 16, wherein the modified phenolic novolak resin has a softening point between about 100° C. and about 120° C.

19. A vulcanizable rubber composition, comprising (a) a rubber component selected from natural rubber, synthetic rubber or combinations thereof, (b) a methylene donor compound which generates formaldehyde upon heating, and (c) a methylene acceptor compound comprising a modified phenolic novolak resin obtained by reacting a phenolic compound with an aliphatic polyol and an aldehyde in the presence of an acid catalyst at a pH less than 7.

20. The vulcanizable rubber composition of claim 19, wherein the mole ratio of the aldehyde to the phenolic compound is less than 0.9:1.

21. The vulcanizable rubber composition of claim 19, wherein the pH is less than 4.

22. The vulcanizable rubber composition of claim 19, wherein the phenolic compound is an unsubstituted resorcinol or a substituted resorcinol.

23. The vulcanizable rubber composition of claim 19, wherein the aliphatic polyol is selected from the group consisting of 2,4-pentanediol, 2,3-pentanediol, 2-methyl-2,4-pentanediol, 2,4-dimethyl-2,4-pentanediol and 2,4,4-trimethyl-2,3-pentanediol.

24. The vulcanizable rubber composition of claim 19, wherein the aldehyde is formaldehyde, acetaldehyde, propionaldehyde, butyraldehyde, iso-butyraldehyde, n-valeraldehyde, benzaldehyde, crotonaldehyde, cinnamaldehyde, glyoxal, glutaraldehyde, furfural, phenylacetaldehyde, chloral, chloroacetaldehyde, dichloroacetaldehyde, laurylaldehyde, palmitylaldehyde, stearylaldehyde or a combination thereof.

25. The vulcanizable rubber composition of claim 19, wherein the methylene donor is selected from the group consisting of paraformaldehyde, hexamethylenetetramine, methylol melamines, etherified methylol melamines and esterified methylol melamines.

26. The vulcanizable rubber composition of claim 19, wherein the vulcanizable rubber composition further comprises a vulcanizing agent, an accelerator, a reinforcing material, carbon black, a cobalt salt, stearic acid, silica, zinc oxide, a filler, a plasticizer, a wax, a processing oil, a retarder, an antiozonant or a combination thereof.

27. A process for making a modified phenolic novolak resin, comprising the step of reacting a phenolic compound with an aliphatic polyol and an aldehyde in the presence of an acid catalyst at a pH less than 7.

28. The process of claim 27, wherein the mole ratio of the aldehyde to the phenolic compound is less than 0.9:1.

29. The process of claim 27, wherein the pH is less than 4.

30. The process of claim 27, wherein the acid catalyst is selected from the group consisting of benzenesulfonic acid, benzene-1,2-disulfonic acid, benzene-1,3-disulfonic acid, benzene-1,4-disulfonic acid, p-toluenesulfonic acid, xylenesulfonic acid, 2,4,6-trimethylbenzenesulfonic acid, oxalic acid, methanesulfonic acid, 4-chlorobenzenesulfonic acid and combinations thereof.

31. The process of claim 27, wherein the phenolic compound is represented by Formula (I):

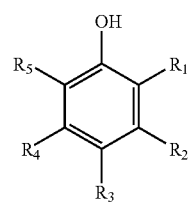

(I)

wherein each of $R_1$, $R_2$, $R_3$, $R_4$ and $R_5$ is independently H, hydroxyl, thiol, amido, halogen, cyano, nitro, amino, acyl, alkyl, heteroalkyl, cycloalkyl, heterocycloalkyl, aryl, heteroaryl, aralkyl, alkenyl, alkynyl, alkoxy, aryloxy, acyloxy, acylamino, alkoxycarbonyl or a part of a ring where two of $R_1$, $R_2$, $R_3$, $R_4$ and $R_5$ together from the ring with the proviso that at least two of $R_1$, $R_2$, $R_3$, $R_4$ and $R_5$ are H.

32. The process of claim 27, wherein the aliphatic polyol is selected from the group consisting of 2,4-pentanediol, 2,3-pentanediol, 2-methyl-2,4-pentanediol, 2,4-dimethyl-2,4-pentanediol and 2,4,4-trimethyl-2,3-pentanediol.

33. The process of claim 27, wherein the aldehyde is formaldehyde, acetaldehyde, propionaldehyde, butyraldehyde, iso-butyraldehyde, n-valeraldehyde, benzaldehyde, crotonaldehyde, cinnamaldehyde, glyoxal, glutaraldehyde, furfural, phenylacetaldehyde, chloral, chloroacetaldehyde, dichloroacetaldehyde, laurylaldehyde, palmitylaldehyde, stearylaldehyde or a combination thereof.

34. The process of claim 27, wherein the phenolic compound is resorcinol and the aldehyde is formaldehyde.

35. The process of claim 34, wherein the modified phenolic novolak resin has a free resorcinol content of less than 5 weight percent.

36. The process of claim 34, wherein the modified phenolic novolak resin has a softening point between about 100° C. and about 120° C.

37. The process of claim 27, wherein the phenolic compound reacts with the aliphatic polyol and the aldehyde simultaneously.

38. The process of claim 37, wherein the phenolic compound reacts with the aliphatic polyol and the aldehyde sequentially.

39. The process of claim 38, wherein the phenolic compound reacts first with the aliphatic polyol and then with the aldehyde.

40. The process of claim 38, wherein the phenolic compound reacts first with the aldehyde and then with the aliphatic polyol.

41. A modified phenolic novolak resin obtainable by reacting a unsubstituted or substituted resorcinol with an aliphatic polyol and an aldehyde in the presence of an acid catalyst.

42. The modified phenolic novolak resin of claim 41, wherein the aliphatic polyol is a diol.

43. The modified phenolic novolak resin of claim 42, wherein the mole ratio of the phenolic compound to the aliphatic diol is between about 1:0.3 and about 1:1.5.

44. The modified phenolic novolak resin of claim 42, wherein the mole ratio of the phenolic compound to the aliphatic diol is between about 1:0.65 and about 1:0.85.

45. The modified phenolic novolak resin of claim 42, wherein the diol is a pentanediol.

46. The modified phenolic novolak resin of claim 45, wherein the aldehyde is formaldehyde.

47. The modified phenolic novolak resin of claim 46, wherein the resorcinol is unsubstituted resorcinol.

* * * * *

UNITED STATES PATENT AND TRADEMARK OFFICE
CERTIFICATE OF CORRECTION

PATENT NO. : 7,498,371 B2　　　　　　　　　　　　　　　　　　　　　　　Page 1 of 1
APPLICATION NO. : 11/234423
DATED : March 3, 2009
INVENTOR(S) : Durairaj et al.

It is certified that error appears in the above-identified patent and that said Letters Patent is hereby corrected as shown below:

In column 5, line 57, delete "from" and insert -- form --.

In column 21, line 1, delete "from" and insert -- form --.

In column 21, line 39, delete "100°C." and insert -- 100°C --.

In column 21, line 46, delete "from" and insert -- form --.

In column 22, line 66, delete "100°C." and insert -- 100°C --.

In column 23, line 13, delete "obtainable" and insert -- obtained --.

Signed and Sealed this

Fifth Day of May, 2009

JOHN DOLL
*Acting Director of the United States Patent and Trademark Office*